(12) United States Patent
Plourde et al.

(10) Patent No.: US 11,905,070 B2
(45) Date of Patent: Feb. 20, 2024

(54) REPULPABLE ZIPPER FOR ZIP PACKAGING

(71) Applicant: Illinois Tool Works Inc., Glenview, IL (US)

(72) Inventors: Eric P. Plourde, Frankfort, IL (US); Christine N. Shimel, Chicago, IL (US); Lars G. Wihlborg, Stratford, CT (US)

(73) Assignee: Illinois Tool Works Inc., Glenview, IL (US)

( * ) Notice: Subject to any disclaimer, the term of this patent is extended or adjusted under 35 U.S.C. 154(b) by 91 days.

(21) Appl. No.: 17/160,469

(22) Filed: Jan. 28, 2021

(65) Prior Publication Data
US 2021/0284396 A1 Sep. 16, 2021

Related U.S. Application Data

(60) Provisional application No. 62/988,448, filed on Mar. 12, 2020.

(51) Int. Cl.
*B65D 33/25* (2006.01)
*B65D 65/46* (2006.01)
(Continued)

(52) U.S. Cl.
CPC ......... *B65D 33/2584* (2020.05); *B65D 31/04* (2013.01); *B65D 33/2541* (2013.01);
(Continued)

(58) Field of Classification Search
CPC ....... C08L 29/04; C08K 7/02; B29L 2005/00; B29K 2023/086; B29K 2029/04;
(Continued)

(56) References Cited

U.S. PATENT DOCUMENTS 5,199,795 A * 4/1993 Russo ................. B65D 85/84
604/408
5,362,778 A * 11/1994 Famili ................. C08L 29/04
264/211.21
(Continued)

FOREIGN PATENT DOCUMENTS

WO 9411257 5/1994
WO 9843877 10/1998
(Continued)

OTHER PUBLICATIONS

International Preliminary Report on Patentability for PCT/US21/021680, dated Sep. 6, 2022.
(Continued)

*Primary Examiner* — Michael C Romanowski
(74) *Attorney, Agent, or Firm* — Maxwell J. Petersen; FisherBroyles LLP

(57) ABSTRACT

A repulpable zipper is provided for attachment to a repulpable flexible package. The repulpable zipper is formed using a water-soluble polymer combined with a repulpable material, such as a plant-based cellulose material. The repulpable zipper enables the repulpable package to be opened and closed by the consumer, so that the consumer has the option to determine, change or manipulate the contents of the repulpable flexible package.

21 Claims, 2 Drawing Sheets

(51) Int. Cl.
*C08L 1/26* (2006.01)
*C08L 29/04* (2006.01)
*B65D 30/08* (2006.01)
*C08L 97/02* (2006.01)
*D21H 17/36* (2006.01)
*B65D 65/38* (2006.01)

(52) U.S. Cl.
CPC .............. *B65D 65/46* (2013.01); *C08L 1/26* (2013.01); *C08L 29/04* (2013.01); *C08L 97/02* (2013.01); *B65D 33/25* (2013.01); *B65D 33/2508* (2013.01); *B65D 65/38* (2013.01); *D21H 17/36* (2013.01)

(58) Field of Classification Search
CPC .... B65D 33/1683; B65D 33/24; B65D 33/25; B65D 33/2508; B65D 33/2541; B65D 33/2584; B65D 33/2589
USPC ......... 383/61.3, 97; 428/34.2, 34.3; 206/810
See application file for complete search history.

(56) References Cited

U.S. PATENT DOCUMENTS

| | | | |
|---|---|---|---|
| 5,520,463 A * | 5/1996 | Tilman | B65D 33/2541 383/63 |
| 6,071,011 A * | 6/2000 | Thomas | B65B 43/123 383/203 |
| 6,960,374 B1 * | 11/2005 | Terada | B32B 27/08 383/61.3 |
| 7,637,297 B2 | 12/2009 | Plourde | |
| 8,549,713 B2 | 10/2013 | Anzini et al. | |
| 8,690,046 B2 | 4/2014 | Plourde | |
| 8,728,448 B2 | 5/2014 | Verrall et al. | |
| 9,216,845 B2 | 12/2015 | Ausnit et al. | |
| 9,238,526 B2 | 1/2016 | Anzini et al. | |
| 9,242,417 B2 | 1/2016 | Olechowski et al. | |
| 9,260,225 B2 | 2/2016 | Anzini et al. | |
| 9,750,314 B2 | 9/2017 | Ausnit et al. | |
| 10,011,397 B2 | 7/2018 | Ausnit et al. | |
| 10,065,770 B2 | 9/2018 | Howell et al. | |
| 10,858,147 B2 | 12/2020 | Kozarky et al. | |
| 2003/0198826 A1 * | 10/2003 | Seydel | D21H 21/20 428/498 |
| 2005/0092451 A1 * | 5/2005 | Choi | D21H 11/12 162/146 |
| 2006/0090308 A1 | 5/2006 | Plourde et al. | |
| 2006/0128582 A1 | 6/2006 | Ross et al. | |
| 2006/0128592 A1 | 6/2006 | Ross | |
| 2006/0159372 A1 | 7/2006 | Plourde et al. | |
| 2006/0285773 A1 * | 12/2006 | Shaffer | B65D 33/2508 24/585.12 |
| 2007/0271742 A1 * | 11/2007 | Johnson | B65D 81/267 24/399 |
| 2007/0289108 A1 | 12/2007 | Plourde et al. | |
| 2009/0123736 A1 * | 5/2009 | Green | B32B 27/10 428/339 |
| 2010/0158417 A1 * | 6/2010 | Sharp | B32B 27/302 493/267 |
| 2010/0278457 A1 | 11/2010 | Greco et al. | |
| 2011/0026854 A1 * | 2/2011 | LaFauci | B65D 81/3266 383/1 |
| 2011/0293204 A1 | 12/2011 | Plourde | |
| 2012/0106879 A1 * | 5/2012 | Fiorini | B32B 29/005 493/267 |
| 2012/0189232 A1 | 7/2012 | Anzini et al. | |
| 2013/0174386 A1 | 7/2013 | Koenigkramer | |
| 2014/0119678 A1 | 5/2014 | Ausnit et al. | |
| 2014/0349045 A1 | 11/2014 | Cloutier et al. | |
| 2015/0298864 A1 | 10/2015 | Ausnit et al. | |
| 2016/0031608 A1 | 2/2016 | Olechowski et al. | |
| 2016/0120727 A1 * | 5/2016 | Harreld | B29C 48/21 264/145 |
| 2017/0081085 A1 | 3/2017 | Ausnit et al. | |
| 2017/0259976 A1 * | 9/2017 | Lee | C08K 3/014 |
| 2017/0298572 A1 * | 10/2017 | Sumnicht | B29C 48/022 |
| 2019/0161243 A1 * | 5/2019 | Thompson | B65D 33/2589 |
| 2020/0040163 A1 * | 2/2020 | Cigada | C08L 3/02 |
| 2020/0283959 A1 * | 9/2020 | Flynn | D21H 27/30 |
| 2021/0301056 A1 | 9/2021 | Sisco et al. | |
| 2022/0153477 A1 * | 5/2022 | Giusti | D21H 27/10 |
| 2022/0324617 A1 | 10/2022 | Beelen | |
| 2023/0112098 A1 | 4/2023 | Koga et al. | |

FOREIGN PATENT DOCUMENTS

| | | | |
|---|---|---|---|
| WO | WO-2013044933 A1 * | 4/2013 | ............... B65D 3/22 |
| WO | 2021183629 | 9/2021 | |
| WO | 2022243757 | 11/2022 | |

OTHER PUBLICATIONS

International Search Report and Written Opinion for PCT/US21/021680, dated Jun. 22, 2021.

Office Action dated Jul. 31, 2023, in corresponding Chile Patent Application 202202373.

* cited by examiner

C
REPULPABLE ZIPPER FOR ZIP PACKAGING

RELATED APPLICATIONS

This patent application claims priority based on U.S. Provisional Application 62/988,448, filed on Mar. 12, 2020, the disclosure of which is incorporated herein by reference.

FIELD OF THE INVENTION

This invention is directed to a repulpable zipper having a water-soluble polymer component, useful for repulpable flexible zip packages, and a repulpable flexible zip package that includes the repulpable zipper.

BACKGROUND OF THE INVENTION

Flexible packages that dissolve in water have found use for packaging dry, granulated soaps such as laundry and dishwasher soaps, chemical additives, industrial cleaners, paint mixing, and other uses where pre-measured quantities of a substance are advantageous. For example, water-soluble flexible packages made from polyvinyl alcohol can dissolve in water and many other liquids, causing release of the package contents.

Repulpable packages made from cellulose materials have found increasing use as the demand for repulpable materials increases. As with flexible packages that dissolve in water, flexible packages that are repulpable have generally been limited to use with pre-measured quantities of foods and other contents. Until now, these packages have been pre-filled by the manufacturers and closed using heat sealing, gluing, and similar techniques. The consumer does not have a convenient way to open the packages and vary the contents before using them. Consumers must typically accept the pre-measured quantities of ingredients and do not have the flexibility to vary them. Moreover, consumers do not have a convenient way to prepare their own repulpable packages containing pre-measured quantities of ingredients, because such packages cannot be readily closed and sealed by the consumers.

Until now, flexible packages that are re-closeable have generally been constructed of plastics that are not repulpable. The entire field of flexible packages whose contents are determined by consumers has been dominated by non-repulpable materials. Re-closeable sandwich bags and other re-closeable food packages are typically non-repulpable.

There is a need or desire in the art for repulpable flexible packages that can be opened and closed by consumers.

There is also a need or desire in the art for pre-packaged repulpable flexible packages whose contents can be readily varied at the consumer level.

There is also a need or desire for repulpable flexible packages that can be filled by consumers with desired contents to desired levels, sealed, and stored for future use.

SUMMARY OF THE INVENTION

The present invention is directed to a repulpable re-closeable flexible package and a repulpable zipper for a repulpable flexible package. As used herein, the term "repulpable" refers to a cellulose material whose fibers can be broken down and returned to the pulp state and suspended in a liquid such as water. The dissociated fibers can then be re-used (e.g., re-combined) to make a new cellulose material. Examples of repulpable materials include various papers, cardboards and other cellulose-based materials. The repulpable zipper enables the production of fully repulpable flexible packages that can be opened and re-closed by the consumer.

In one embodiment, the invention is directed to a repulpable, re-closeable flexible package including the following elements:
  repulpable front and back walls, each including a first side, a second side, a top and a bottom;
  the repulpable front and back walls being joined together at the respective first sides, second sides and bottoms;
  a re-closeable mouth defined by the top of the front wall and the top of the back wall; and
  a repulpable zipper positioned at the top of the front wall and the top of the back wall, the repulpable zipper including at least one interlocking element connected to the front wall and at least one interlocking element connected to the back wall;
  the repulpable zipper being movable between a first open position that disengages the at least one interlocking element connected to the front wall from the at least one interlocking element connected to the back wall and a second closed position that engages the at least one interlocking element connected to the front wall to the at least one interlocking element connected to the back wall;
  wherein the repulpable zipper includes about 10% to 90% by weight of a water-soluble polymer and about 10% to about 90% by weight of a plant-based cellulose material.

In another embodiment, the invention is directed to a repulpable zipper that includes the following elements:
  at least one interlocking element adapted for connection to a first wall of a flexible package; and
  at least one interlocking element adapted for connection to a second wall of the flexible package;
  the repulpable zipper including about 10% to about 90% by weight of a water-soluble polymer and about 10% to about 90% by weight of a plant-based cellulose material;
  the repulpable zipper being movable between a first open position that disengages the at least one interlocking element adapted for connection to the first wall from the at least one interlocking element adapted for connection to the second wall and a second closed position that engages the at least one interlocking element adapted for connection to the first wall to the at least one interlocking element adapted for connection to the second wall.

In another embodiment, the invention is directed to a method of making a repulpable zipper for a re-closeable flexible package. The method includes the following steps:
  forming at least one first interlocking element adapted for connection to a first wall of a flexible package using a repulpable material; and
  forming at least one second interlocking element adapted for connection to a second wall of the flexible package using the repulpable material;
  the repulpable zipper being movable between a first open position that disengages the at least one first interlocking element from the at least one second interlocking element and a second closed position that engages the at least one first interlocking element to the at least one second interlocking element;

the repulpable material including about 10% to about 90% by weight of a water-soluble polymer and about 10% to about 90% by weight of a plant-based cellulose material.

With the foregoing in mind, it is a feature and advantage of the invention to provide a repulpable flexible package that can be opened and closed by consumers.

It is also a feature and advantage of the invention to provide a repulpable flexible package that can be filled by consumers with desired contents to desired levels, sealed, and stored for future use.

It is also a feature and advantage of the invention to provide a repulpable zipper that enables the production of repulpable flexible packages that can be opened and closed by consumers, and the contents varied.

The foregoing characteristics and advantages of the invention will become further apparent from the following Detailed Description, read in conjunction with the drawings.

DETAILED DESCRIPTION OF THE INVENTION

The present invention is directed to a repulpable, re-closeable flexible package, a repulpable zipper for a re-closeable flexible package, and a method of making a repulpable zipper for a re-closeable flexible package. The repulpable, re-closeable flexible package and the repulpable zipper can have any conventional structure that is known in the art of re-closeable flexible packages. The specific structures described herein are exemplary.

Exemplary Structures for Repulpable Package and Repulpable Zipper

Figure 1:
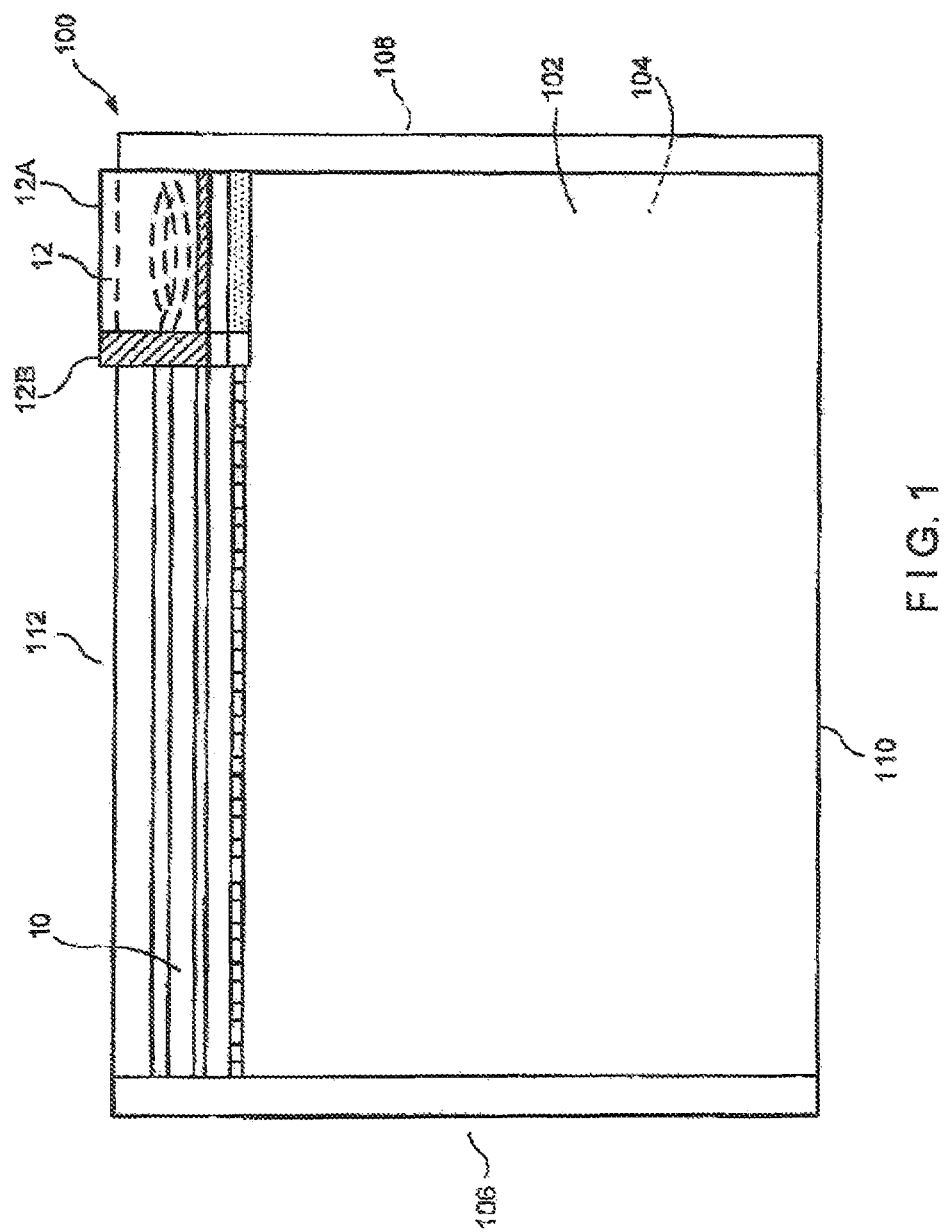
FIG. 1 is a plan view of an exemplary repulpable, re-closeable flexible package according to the invention.

Referring to FIG. 1, a repulpable, re-closeable flexible package 100 includes a repulpable front wall 102 and a repulpable back wall 104, each one having a first side 106, a second side 108, a bottom 110 and a top 112. The repulpable front and back walls 102 and 104 are joined together at their respective first sides 106, second sides 108 and bottoms 110. Each of the respective joinders can be a fold (if the front and back walls are continuous), or a heat seal, or any suitable joint that is essentially permanent and cannot be opened and re-closed.

Figure 2:
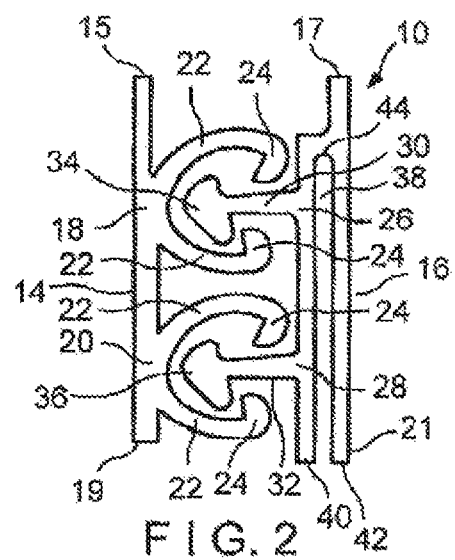
FIG. 2 is a cross-sectional view of a first exemplary embodiment of a repulpable zipper according to the invention.

The respective tops 112 of the front and back walls 102 and 104 define a mouth that can be opened and closed using a repulpable zipper 10 defined by interlocking elements (exemplified in FIGS. 2-4) that are connected to and/or adjacent to the tops 112 of the respective front and back walls. As shown in FIGS. 2, for example, the repulpable zipper 10 includes at least one (or more than one) first interlocking element 18, 20 connected to the front wall 102 and at least one (or more than one) second interlocking element 26, 28 connected to the back wall 104 of the repulpable, re-closeable flexible package 10. The repulpable zipper 10 is movable between a first open position that disengages each of the first interlocking elements 18, 20 from each of the second interlocking elements 26, 28, and a second closed position that engages each of the first interlocking elements 18, 20 to each of the respective second interlocking elements 26, 28.

Depending on the specific structure of the repulpable zipper, the engagement and disengagement of the first and second interlocking elements can be accomplished using manual pressure, in which the consumer uses his or her hands to press the interlocking elements into engagement or separate them into disengagement, or with the aid of a repulpable slider 12 having an opening end 12A and a closing end 12B. The slider 12 can be movable between a first position adjacent to the first sides 106 that opens the mouth at the tops 112 and a second position adjacent to the second sides 108 that closes the mouth at the tops 112 of the flexible package 100.

The repulpable zipper 10 and the repulpable slider 12 can have a wide variety of configurations. FIG. 2 illustrates a double zipper embodiment with first and second zipper profiles 14 and 16 upwardly terminating in first and second upper flanges 15 and 17, and downwardly terminating in first and second lower flanges 19 and 21. The first interlocking elements 18 and 20 are female interlocking elements formed by arcuate extending arms 22 terminating in detent hooks 24. The second interlocking elements 26 and 28 are male interlocking elements having first and second shafts 30 and 32 terminating in respective first and second arrowhead detent elements 34 and 36. The second zipper profile 16 also includes a hinge structure 38 formed by an inner flange 40, from which the second interlocking elements 26 and 28 extend, and an outer flange 42 joining at pivot point 44 downwardly adjacent from the top surface of second zipper profile 16.

Figure 3:
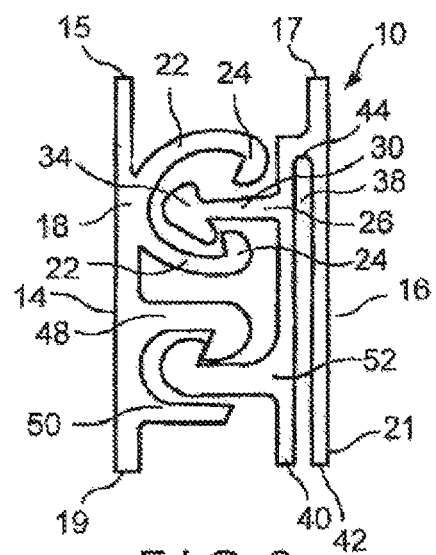
FIG. 3 is a cross-sectional view of a second exemplary embodiment of a repulpable zipper according to the invention.
Figure 4:
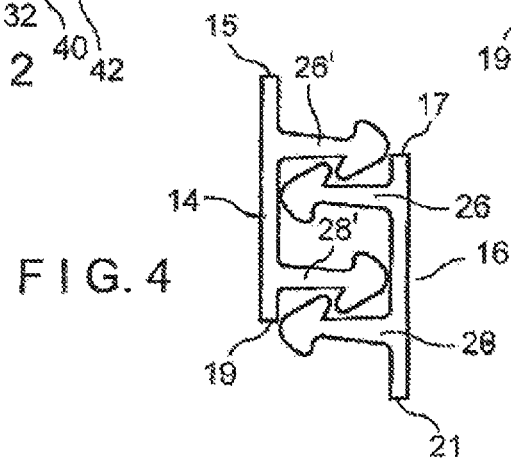
FIG. 4 is a cross-sectional view of a third exemplary embodiment of a repulpable zipper according to the invention.

The repulpable zipper 10 shown in FIG. 3 is like that of FIG. 2 except that one of the first interlocking elements 20 is replaced with a first arm 48 with a self-mating hook that can mate with a similar or identical structure, with guide post 50, and one of the second interlocking elements 28 is replaced with a second arm 52 with a self-mating hook. FIG. 4 shows another embodiment of repulpable zipper 10 having a first zipper profile 14 with first interlocking elements 26' and 28' and a second zipper profile 16 with second interlocking elements 26 and 28, all of which are male elements. In each of the foregoing embodiments, the first interlocking elements can be connected or adapted for connection to the front wall 102, and the second interlocking elements can be connected or adapted for connection to the back wall 104 of the repulpable, re-closeable flexible package 100. In various embodiments (not shown), the zipper can be continuous between the front and back walls so that the at least one interlocking element connected (or adapted for connection) to the front wall is the same as the at least one interlocking element connected (or adapted for connection) to the back wall.

The repulpable zipper 10 can include about 10% to about 90% by weight of a water-soluble polymer and about 10% to about 90% by weight of a repulpable material. Suitably, the repulpable zipper can include about 25% to about 75% by weight of a water-soluble polymer and about 25% to about 75% by weight of a repulpable material, or about 40% to about 60% by weight of a water-soluble polymer and about 40% to about 60% by weight of a repulpable material. The repulpable material can be a plant-based cellulose material as described below. The repulpable material can be either blended with the water-polymer or coated with the water-soluble polymer, or both. For example, paper can be coated so that the inside surfaces of the walls have a coating on them to help facilitate forming/sealing the package as well as providing better surfaces to attach the zipper. A repulpable cellulose material can also be coated with minor amounts of a water-insoluble polymer such as an acrylic, provided that the overall zipper 10 is repulpable. Exemplary water-soluble polymers and repulpable cellulose materials are described below.

Water-Soluble Polymers for Repulpable Zipper

The repulpable zipper 10 and the repulpable slider 12 (when present) can include any suitable water-soluble polymer that will dissolve in water or aqueous liquids. Suitable water-soluble polymers include without limitation alkali-soluble polyvinyl acetate copolymers, ethylene-maleic anhydride copolymers, polyacrylates, polyethers, polyvinyl alcohol, ethylene vinyl alcohol, polyvinyl pyrrolidone, polyacrylamides, styrene-maleic anhydride, water-soluble cellulosic ethers, hydroxyethylcellulose, methycellulose, sodium carboxymethylcellulose, and combinations thereof. When present, the repulpable slider 12 can be formed using the same water-soluble polymer as the remainder of the repulpable zipper 10, or can be formed using a different (e.g., stiffer) water-soluble polymer.

Alkali-soluble polyvinyl acetate copolymers are soluble in aqueous solutions that have been treated with a base. Suitable polymers include polyvinyl acetate copolymers in which the vinyl acetate is copolymerized with an acidic comonomer. The acid-base reactions dissociate the polymer molecules into liquid monomers, resulting in dissolution. Ethylene-maleic anhydride copolymers include both linear copolymers of ethylene and maleic anhydride and copolymers that have been crosslinked with anhydride, free acid or amide-ammonium salt side chains.

Suitable water-soluble polyacrylates include polymers of acrylic acid, polymers of methacrylic acid, and combinations thereof. Also included are polymers of acrylic acid and polymers of methacrylic acid that have been neutralized with bases to their salt forms. Suitable polyethers include polyoxyethylenes, polymethyl ethyl ethers, and combinations thereof. Polyoxyethylenes are typically waxy and should therefore be used in combination with a stiffer polymer such as ethylene vinyl alcohol or polyvinyl alcohol. Polyvinyl ethers readily dissolve in water at temperatures up to about 35° C. and become less soluble at higher temperatures.

Polyvinyl alcohol and ethylene vinyl alcohol are both soluble in water and possess the structural integrity and flexibility needed for repulpable zippers, with or without a repulpable slider. These polymers can be readily extruded into the shapes and profiles that are typical of packaging zippers. These polymers can also be readily heat sealed or laminated onto paper, which can be used to form the walls 102 and 104 of a repulpable flexible package 100 as described above.

High molecular weight polyvinyl pyrrolidone is soluble in water and various organic solvents. Because of its tackiness, can suitably be combined with another water-soluble polymer and/or a suitable amount of repulpable (e.g., plant-based cellulose) material that contributes structural integrity to the repulpable zipper. High molecular weight polyacrylamide exhibits similar tackiness and can also be combined with another water-soluble polymer that contributes structural integrity. Styrene-maleic anhydride copolymers are soluble in alkaline water and in some organic solvents. These resins can readily be heat sealed or otherwise laminated to paper and other plant-based cellulose materials, the latter of which can be used to form the walls 102 and 104 of a repulpable flexible package 100 as described above.

Various cellulosic polymers can be used to form the repulpable zipper 10 of the invention. Water-soluble cellulose ether polymers prepared from alpha-cellulose are hygroscopic and have film-forming properties useful in preparing the water-soluble zippers and connecting them to the front and back walls 102 and 104 of the flexible package. Hydroxyethylcellulose, prepared by reacting alkali cellulose with ethylene oxide, can be made completely water-soluble or only alkali-soluble depending on the extent of the reaction. This polymer can be used alone or in combination with another, and is highly compatible with the foregoing polyvinyl acetate, polyvinyl alcohol and ethylene-vinyl alcohol polymers and copolymers. Polymers of methycellulose and polymers of sodium carboxymethylcellulose also exhibit excellent water-solubility and are compatible with paper and other cellulose materials that can be used to form the front and back walls 102 and 104 of the flexible package 100.

Repulpable Materials for Repulpable Zipper

The repulpable zipper 10 and the repulpable slider 12 (when present) can include any suitable repulpable material within the ranges stated above. The term "repulpable" refers to a paper or other sheet material that can be converted back into dissociated pulp or fibers for possible recycling. For purposes of the repulpable zipper 10 and repulpable slider 12, suitable repulpable materials include plant-based cellulose materials. Suitable plant-based cellulose materials include without limitation wood pulp, paper fibers, cotton, linen, silk, wool, and combinations thereof. While other (e.g., non-cellulose) materials may qualify as repulpable, the plant-based cellulose materials, combined with suitable amounts of water-soluble polymer, contribute the mechanical and structural integrity that is needed for functioning as a repulpable zipper 10 for a flexible package.

Materials Used to Form Repulpable Flexible Package

The materials used to form the repulpable, re-closeable flexible package 100 (excluding the zipper 10) fall into the same two categories. The first category includes water-soluble flexible polymers that dissolve in water, and possibly other liquids, releasing the contents of the package. These types of packages are used for packaging dry, granulated soaps such as laundry and dishwasher soaps, chemical additives, industrial cleaners, paint mixing, and other uses where pre-measured quantities of a substance are advantageous. The second category includes repulpable materials, such as plant-based cellulose materials that are intended to replace disposable non-repulpable plastic packages. The repulpable flexible package can include about 10% to about 90% by weight of a water-soluble polymer and about 10% to about 90% by weight of a repulpable material. Suitably, the repulpable flexible package can include about 25% to about 75% by weight of a water-soluble polymer and about 25% to about 75% by weight of a repulpable material, or about 40% to about 60% by weight of a water-soluble polymer and about 40% to about 60% by weight of a repulpable material.

Suitable polymers may include any of the foregoing polymers and polymer combinations that are useful for the repulpable zipper. Suitable water-soluble polymers include without limitation alkali-soluble polyvinyl acetate copolymers, ethylene-maleic anhydride copolymers, polyacrylates, polyethers, polyvinyl alcohol, ethylene vinyl alcohol, polyvinyl pyrrolidone, polyacrylamides, styrene-maleic anhydride, water-soluble cellulosic ethers, hydroxyethylcellulose, methycellulose, sodium carboxymethylcellulose, and combinations thereof. In these embodiments, the water-soluble polymer used to form the body of the flexible package 100 (i.e., the front wall 102 and the back wall 104) can be the same water-soluble polymer or polymer combination used to form the zipper 12 or can be a different water-soluble polymer or polymer combination.

The repulpable material can be plant-based cellulose material. The plant-based cellulose material can include without limitation wood pulp, paper fibers, cotton, linen, silk, wool, and combinations thereof. While other (e.g., non-cellulose) materials may qualify, the plant-based cellulose materials, combined with suitable amounts of water-soluble polymer, contribute the mechanical and structural integrity that is needed for functioning as a front wall 102 and back wall 104 for a flexible package 100.

The repulpable zipper 10 and repulpable flexible package 100 can be designed to satisfy various standards for repulpability. Re-pulpability can be measured using the Fibre Box Association's (FBA's) "Voluntary Standard for Repulping and Recycling Corrugated Fiberboard Treated to Improve Its Performance in the Presence of Water and Water Vapor," Rev. Aug. 16, 2013, which is incorporated herein by reference.

The repulpable zipper 10 can be combined with the body (front and back walls) of the repulpable flexible package 100 using any suitable technique, to form the repulpable, re-closeable flexible package 100. Suitable techniques include heat sealing, lamination, adhesive bonding, coextrusion and the like. The repulpable, re-closeable flexible package 100 has the advantage of being fully repulpable while offering the consumer unlimited flexibility to determine or alter the contents of the flexible package or vary the amounts of ingredients contained therein.

The embodiments of the invention described herein are exemplary, and various modifications and improvements can be made without departing from the spirit and scope of the invention. The scope of the invention is defined by the appended claims, and all changes that fall within the meaning and range of equivalents are intended to be embraced therein.

We claim:

1. A repulpable, re-closeable flexible package comprising:
   repulpable front and back walls, each including a first side, a second side, a top and a bottom and formed from a blend of a water-soluble polymer and a plant-based cellulose material;
   the repulpable front and back walls being joined together at the respective first sides, second sides and bottoms;
   a re-closeable mouth defined by the top of the front wall and the top of the back wall; and
   a repulpable zipper positioned at the top of the front wall and the top of the back wall, the repulpable zipper including at least two interlocking elements connected to the front wall and at least two opposing interlocking elements connected to the back wall;
   the repulpable zipper being movable between a first open position that disengages the at least two interlocking elements connected to the front wall from the at least one two opposing interlocking elements connected to the back wall and a second closed position that engages the at least two interlocking elements connected to the front wall to the at least two opposing interlocking elements connected to the back wall;
   wherein the repulpable zipper includes a blend of 10 to 90% by weight of a water-soluble polymer and 10 to 90% by weight of fibers of a plant-based cellulose material.

2. The repulpable, re-closeable flexible package of claim 1, wherein the repulpable zipper includes about 25% to about 75% by weight of the water-soluble polymer and about 25% to about 75% by weight of the fibers.

3. The repulpable, re-closeable flexible package of claim 1, wherein the repulpable zipper includes about 40% to about 60% by weight of the water-soluble polymer and about 40% to about 60% by weight of the fibers.

4. The repulpable, re-closeable flexible package of claim 1, wherein the repulpable zipper further comprises a slider that is movable between a first position adjacent to the first sides to open the mouth and a second position adjacent to the second sides to close the mouth.

5. The repulpable, re-closeable flexible package of claim 1, wherein the water-soluble polymer is selected from the group consisting of alkali-soluble polyvinyl acetate copolymers, ethylene-maleic anhydride copolymers, polyacrylates, polyethers, polyvinyl alcohol, ethylene vinyl alcohol, polyvinyl pyrrolidone, polyacrylamides, styrene-maleic anhydride, water-soluble cellulosic ethers, hydroxyethylcellulose, methycellulose, sodium carboxymethylcellulose, and combinations thereof.

6. The repulpable, re-closeable flexible package of claim 1, wherein the plant-based cellulose material in the repulpable zipper comprises wood pulp.

7. The repulpable, re-closeable flexible package of claim 6, wherein the plant-based cellulose material in the repulpable zipper comprises paper.

8. The repulpable, re-closeable flexible package of claim 1, wherein the plant-based cellulose material in the repulpable zipper comprises cotton.

9. The repulpable, re-closeable flexible package of claim 1, wherein the plant-based cellulose material in the repulpable zipper comprises linen, silk and/or wool.

10. A repulpable zipper, comprising:
    at least two interlocking elements adapted for connection to a first wall of a flexible package; and
    at least two opposing interlocking elements adapted for connection to a second opposing wall of the flexible package;
    the repulpable zipper comprising 10 to 90% by weight of a water-soluble polymer blended with 10 to 90% by weight of fibers of a plant-based cellulose material;
    the repulpable zipper being movable between a first open position that disengages the at least two first interlocking elements adapted for connection to the first wall from the at least two opposing second interlocking elements adapted for connection to the second wall and a second closed position that engages the at least two interlocking elements adapted for connection to the first wall to the at least two opposing interlocking elements adapted for connection to the second wall.

11. The repulpable zipper of claim 10, wherein the repulpable zipper includes about 25% to about 75% by weight of the water-soluble polymer and about 25% to about 75% by weight of the fibers.

12. The repulpable zipper of claim 10, wherein the repulpable zipper includes about 40% to about 60% by weight of the water-soluble polymer and about 40% to about 60% by weight of the fibers.

13. The repulpable zipper of claim 10, further comprising a slider that is movable between a first position that disengages the at least two first interlocking elements from the at least two second interlocking elements and a second position that engages the at least two first interlocking elements to the at least two second interlocking elements.

14. The repulpable zipper of claim 10, wherein the water-soluble polymer is selected from the group consisting of alkali-soluble polyvinyl acetate copolymers, ethylene-maleic anhydride copolymers, polyacrylates, polyethers, polyvinyl alcohol, ethylene vinyl alcohol, polyvinyl pyrrolidone, polyacrylamides, styrene-maleic anhydride, water-soluble cellulosic ethers, hydroxyethylcellulose, methycellulose, sodium carboxymethylcellulose, and combinations thereof.

15. The repulpable zipper of claim 10, wherein the plant-based cellulose material is selected from the group consisting of wood pulp, paper, cotton, linen, silk, wool, and combinations thereof.

16. The repulpable zipper of claim 10, wherein the water-soluble polymer comprises a polyacrylate selected from the group consisting of polymers of acrylic acid, polymers of methacrylic acid, and combinations thereof.

17. The repulpable zipper of claim 10, wherein the water-soluble polymer comprises a polyether selected from the group consisting of polyoxyethylenes, polymethyl ethyl ethers, and combinations thereof.

18. The repulpable zipper of claim 10, wherein the water-soluble polymer comprises polyvinyl alcohol and/or ethylene vinyl alcohol.

19. The repulpable zipper of claim 10, wherein the water-soluble polymer comprises a water-soluble cellulosic ether.

20. The repulpable zipper of claim 10, wherein the water-soluble polymer is selected from the group consisting of polymers of hydroxyethylcellulose, methycellulose, sodium carboxymethylcellulose, and combinations thereof.

21. A method of making a repulpable zipper for a re-closeable flexible package, comprising the steps of:
   forming at least two first interlocking elements adapted for connection to a first wall of a flexible package using a repulpable material; and
   forming at least two opposing second interlocking elements adapted for connection to a second opposing wall of the flexible package using the repulpable material;
   the repulpable zipper being movable between a first open position that disengages the at least two first interlocking elements from the at least two opposing second interlocking elements and a second closed position that engages the at least two first interlocking elements to the at least two opposing second interlocking elements;
   the repulpable material comprising 10 to 90% by weight of a water-soluble polymer blended with 10 to 90% by weight of fibers of a plant-based cellulose material.

* * * * *